United States Patent
Tseng et al.

(10) Patent No.: US 9,461,500 B2
(45) Date of Patent: Oct. 4, 2016

(54) WIRELESS CHARGING RECEIVING DEVICE AND WIRELESS CHARGING SYSTEM USING THE SAME

(71) Applicant: HTC Corporation, Taoyuan County (TW)

(72) Inventors: Chun-Wei Tseng, Taoyuan County (TW); Chien-Ting Ho, Taoyuan County (TW); Chien-Chih Chen, Taoyuan County (TW); Yen-Liang Kuo, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 218 days.

(21) Appl. No.: 14/085,817

(22) Filed: Nov. 21, 2013

(65) Prior Publication Data

US 2015/0137742 A1    May 21, 2015

(51) Int. Cl.
*H02J 7/00* (2006.01)
*H02J 7/02* (2016.01)

(52) U.S. Cl.
CPC .............. *H02J 7/025* (2013.01); *H02J 7/0042* (2013.01)

(58) Field of Classification Search
CPC ........... H02J 7/025; H02J 5/005; H02J 17/00
USPC ........................................................ 320/108
See application file for complete search history.

(56) References Cited

U.S. PATENT DOCUMENTS

| | | | | |
|---|---|---|---|---|
| 2002/0053992 | A1* | 5/2002 | Kawakami | H01Q 1/22 343/767 |
| 2009/0243397 | A1* | 10/2009 | Cook | H02J 5/005 307/104 |
| 2011/0090186 | A1 | 4/2011 | Yamazaki et al. | |
| 2012/0091821 | A1* | 4/2012 | Kato | H01Q 1/38 307/104 |
| 2012/0262357 | A1 | 10/2012 | Kato et al. | |
| 2013/0057208 | A1* | 3/2013 | Takada | B60L 11/182 320/108 |
| 2013/0063873 | A1 | 3/2013 | Wodrich et al. | |

FOREIGN PATENT DOCUMENTS

| | | |
|---|---|---|
| CN | 1359037 A | 7/2002 |
| CN | 100383816 C | 4/2008 |
| CN | 202004480 U | 10/2011 |
| CN | 102405556 A | 4/2012 |
| CN | 102916248 A | 2/2013 |
| CN | 102956974 A | 3/2013 |
| CN | 102804549 B | 8/2013 |

OTHER PUBLICATIONS

Corresponding Taiwanese office action.
The office action of the corresponding Chinese application issued on May 5, 2016.

* cited by examiner

*Primary Examiner* — Nghia Doan
(74) *Attorney, Agent, or Firm* — CKC & Partners Co., Ltd.

(57) ABSTRACT

A wireless charging receiving device includes a body, a metal housing, a receiving coil, and a power storage device. The metal housing is coupled to the body to form an accommodating space. The metal housing includes an aperture and at least one slit. The slit interconnects the aperture and the edge of the metal housing. The receiving coil is disposed between the metal housing and the body. The receiving coil defines a through hole by a looped configuration, and the through hole overlaps at least part of the aperture of the metal housing. The power storage device is disposed within the accommodating space and electrically connected to the receiving coil. Electromagnetic waves are able to pass through the aperture of the metal housing and are magnetically coupled to the receiving coil, such that the receiving coil transfers the energy of the electromagnetic waves to the power storage device.

6 Claims, 7 Drawing Sheets

WIRELESS CHARGING RECEIVING DEVICE AND WIRELESS CHARGING SYSTEM USING THE SAME

BACKGROUND

1. Field of Invention

The subject application relates to a wireless charging receiving device.

2. Description of Related Art

Wireless charging technology utilizes electromagnetic principles to achieve a charging effect. An electronic device may be charged without using a wire so that convenience is improved. Thus, wireless charging technology has become a major area of development in the industry.

However, in order to enhance the aesthetics of an electronic device, a metal housing may be used. For an electronic device with a metal housing, especially a portable electronic device, ten it is wirelessly charged, the metal housing may shield the electromagnetic waves. Even if an aperture is disposed in the metal housing so that electromagnetic waves may pass through the metal housing, inductive current is still generated in the metal housing by the electromagnetic waves. The magnetic field induced by the inductive current typically reduces charging efficiency.

SUMMARY

One aspect of this invention is to provide a wireless charging receiving device. The wireless charging receiving device includes a body, a metal housing, a receiving coil, and a power storage device. The metal housing is coupled to the body to form an accommodating space. The metal housing includes an aperture and at least one slit. The slit interconnects the aperture and the edge of the metal housing. The receiving coil is disposed between the metal housing and the body. The receiving coil defines a through hole by a looped configuration, and the through hole overlaps at least part of the aperture of the metal housing. The power storage device is disposed within the accommodating space and electrically connected to the receiving coil. Electromagnetic waves may pass through the aperture of the metal housing and may be magnetically coupled to the receiving coil, such that the receiving coil transfers the energy of the electromagnetic wave to the power storage device.

In one or more embodiments of this invention, the wireless charging receiving device further includes a capacitor which is electrically coupled to the receiving coil to adjust a resonant frequency of the receiving coil.

In one or more embodiments of this invention, the capacitor is disposed at one end of the receiving coil.

In one or more embodiments of this invention, the wireless charging receiving device further includes a spring strip connected to one end of the receiving coil. The capacitor is electrically coupled to the receiving coil by the spring strip.

In one or more embodiments of this invention, the number of the slits is even and the slits are symmetrically disposed relative to the aperture.

In one or more embodiments of this invention, the wireless charging receiving device further includes a receiving module which is electrically coupled to the receiving coil and the power storage device.

In one or more embodiments of this invention, the receiving module includes a receiving matching circuit, a rectifier, a DC-DC converter and a power management integrated circuit. The receiving matching circuit is utilized to match an impedance between a transmitting source and the receiving coil. The rectifier is utilized to transform an inductive current of the receiving coil to a direct current. The DC-DC converter is utilized to adjust a voltage of the direct current. The power management integrated circuit is connected to the power storage device and is utilized to transmit the direct current to the power storage device and manage power transfer of the power storage device.

Another aspect of this invention is to provide a wireless charging system. The wireless charging system includes a wireless charging transmitting device and the wireless charging receiving device. The wireless charging transmitting device is utilized to provide the electromagnetic waves.

In one or more embodiments of this invention, the wireless charging transmitting device includes a power supply and a transmitting coil. The power supply is utilized to provide an electrical energy. The transmitting coil is utilized to transform the electrical energy to the electromagnetic waves.

In one or more embodiments of this invention, the wireless charging transmitting device includes a transmitting module which is electrically coupled to the power supply and the transmitting coil. The transmitting module includes an amplifier and a transmitting matching circuit. The amplifier is utilized to amplify the electrical energy provided by the power supply. The transmitting matching circuit is utilized to match an impedance between the transmitting coil and the receiving coil.

In one or more embodiments of this invention, the transmitting module further includes a transmitting transceiver and a transmitting control unit. The transmitting transceiver is utilized to communicate with the wireless charging receiving device. The transmitting control unit is electrically coupled to the transmitting transceiver. The transmitting control unit controls the on/off state of the power supply according to the charging status of the wireless charging receiving device.

In one or more embodiments of this invention, the wireless charging transmitting device further includes a capacitor which is electrically coupled to the transmitting coil to adjust an emitting frequency of the transmitting coil.

Because the metal housing has at least one slit, the direction of the inductive magnetic field generated by the metal housing is the same as that of the inductive magnetic field generated by the receiving coil. Therefore, it contributes to increase the inductive current of the receiving coil so that the charging efficiency of the wireless charging receiving device is improved.

DESCRIPTION OF THE EMBODIMENTS

Figure 1:
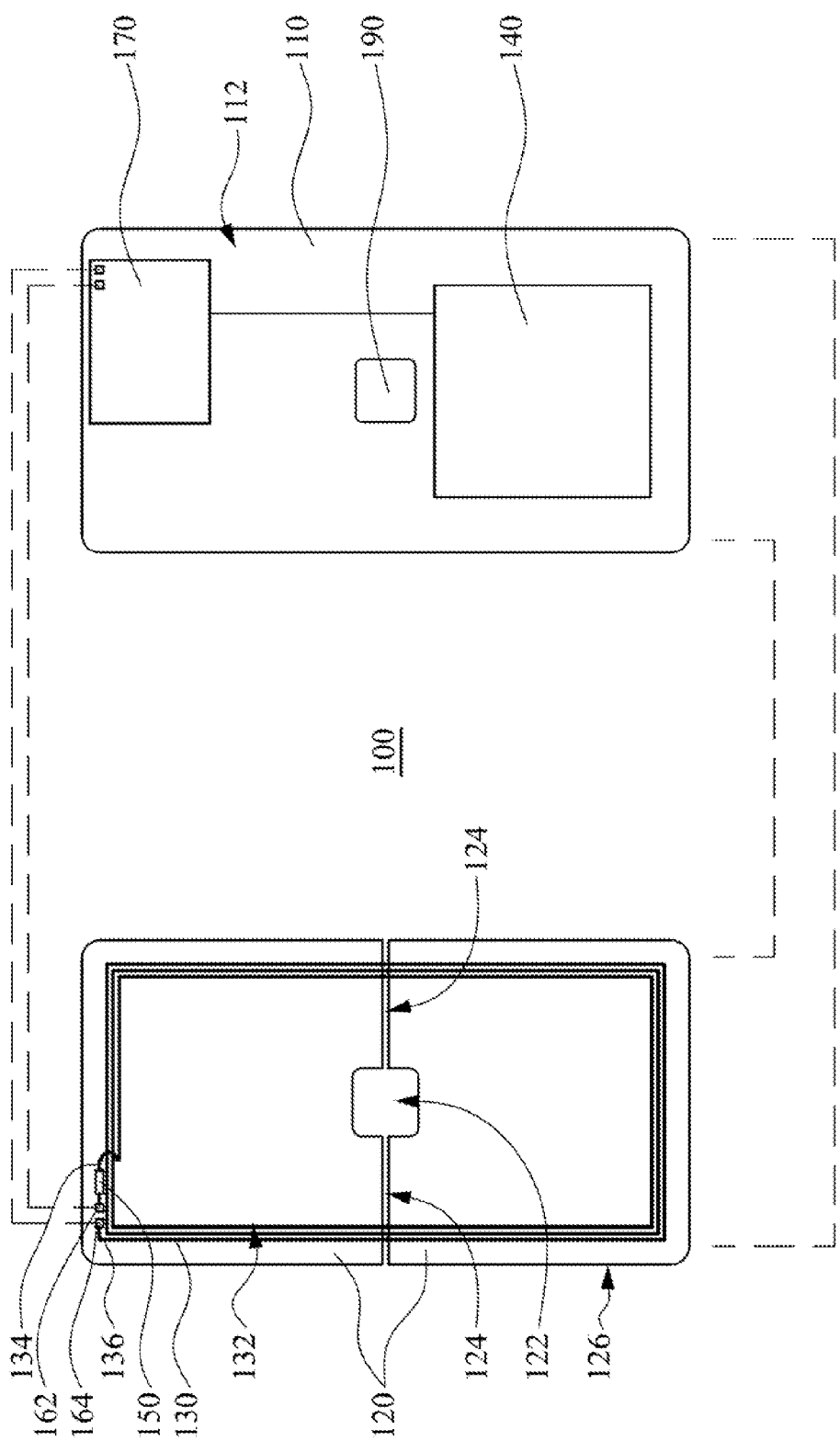
FIG. 1 is a schematic exploded view of a wireless charging receiving device according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic exploded view of a wireless charging receiving device 100 according to one embodiment of this invention. As shown in FIG. 1, the wireless charging receiving device 100 may be, for example, a mobile phone, a laptop computer, a tablet computer, or a handheld device with a communication function. The wireless charging receiving device 100 includes a body 110, a metal housing 120, a receiving coil 130, and a power storage device 140, and may include other elements such as a processor, a substrate, a display element, and a touch input element (not shown). The metal housing 120 is coupled to the body 110 to form an accommodating space. That is, the metal housing 120 covers at least one surface 112 of the body 110. The metal housing 120 includes an aperture 122 and at least one slit 124 some embodiments, the metal housing 120 has two of the slits 124, as shown in FIG. 1. The slit 124 interconnects the aperture 122 and the edge 126 of the metal housing 120. The extension direction of the slit 124 relative to the aperture 122 may be changed depending on the design of the wireless charging receiving device 100. In FIG. 1, for example, the direction is horizontal, although it may be vertical or any other direction. Moreover, the slit 124 may be any shape.

The receiving coil 130 is disposed between the metal housing 120 and the body 110, and it prefers to be coupled to the metal housing 120. The size and position of the receiving coil 130 may be suitably adjusted as required. In order to simplify the explanation, the relation of the elements may be not drawn to scale in this embodiment. In practice, the receiving coil 130 may surround and be close to the aperture 122. The receiving coil 130 defines a through hole 132 by a looped configuration, and the through hole 132 overlaps at least part of the aperture 122 of the metal housing 120. For example, in FIG. 1, the through hole 132 overlaps all of the aperture 122, but this invention is not limited in this regard.

The power storage device 140 is disposed within the accommodating space and is electrically connected to the receiving coil 130. Electromagnetic waves are able to pass through the aperture 122 of the metal housing 120 and be magnetically (inductively) coupled to the receiving coil 130, such that the receiving coil 130 transfers an energy of the electromagnetic waves to the power storage device 140.

Figure 2A:
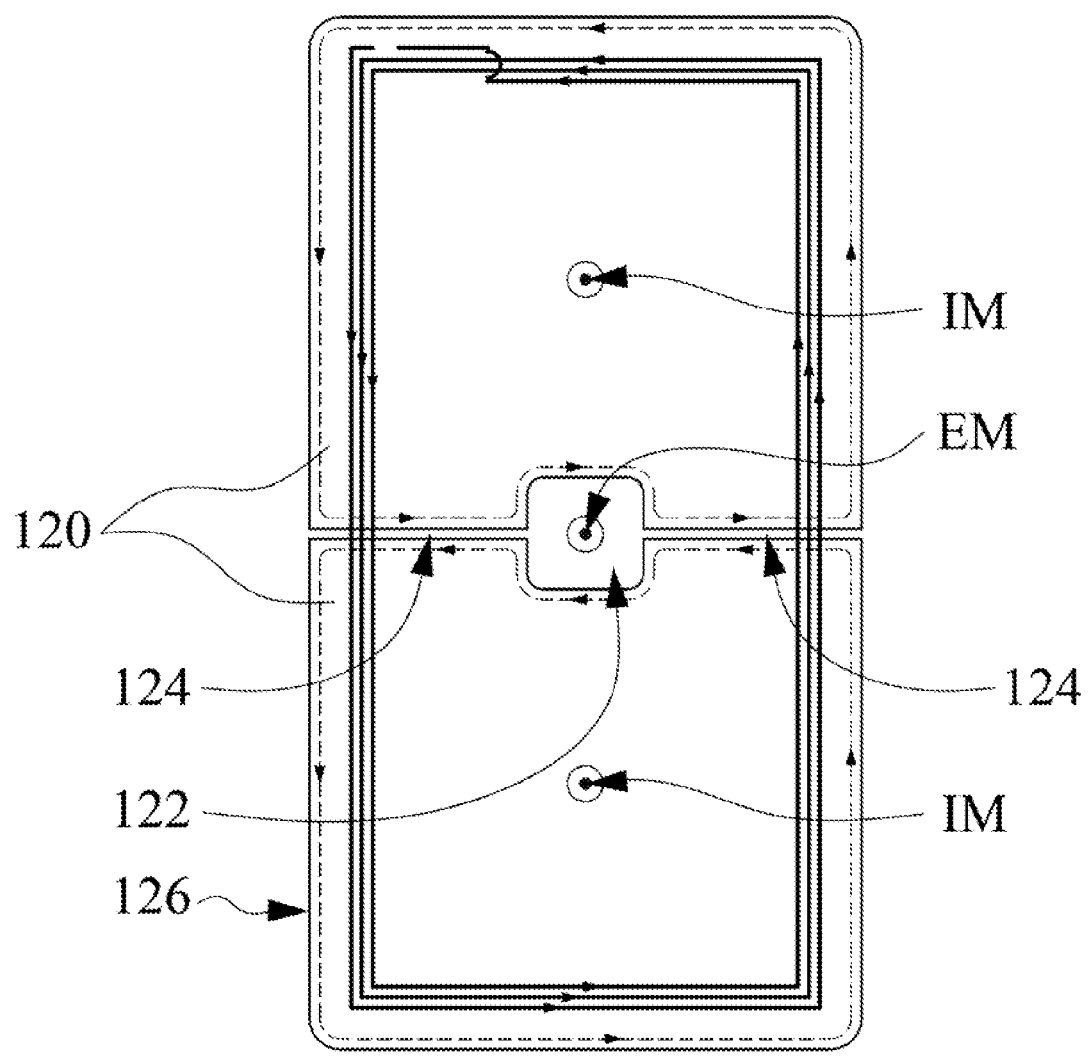
FIG. 2A is a current distribution diagram of a metal housing and a receiving coil in FIG. 1 during charging.

Reference is made to FIG. 2A which is a current distribution diagram of the metal housing 120 and the receiving coil 130 in FIG. 1 during charging. Electromagnetic waves EM may pass through the aperture 122 of the metal housing 120 and may be magnetically (inductively) coupled to the metal housing 120 and the receiving coil 130 respectively. For example, when the magnetic field direction of the electromagnetic waves EM is vertically out of the drawing (shown as ⊙ in FIG. 2A), the electromagnetic waves EM may induce a clockwise inductive current around the aperture 122 of the metal housing 120 and a counterclockwise inductive current in the receiving coil 130.

Figure 2B:
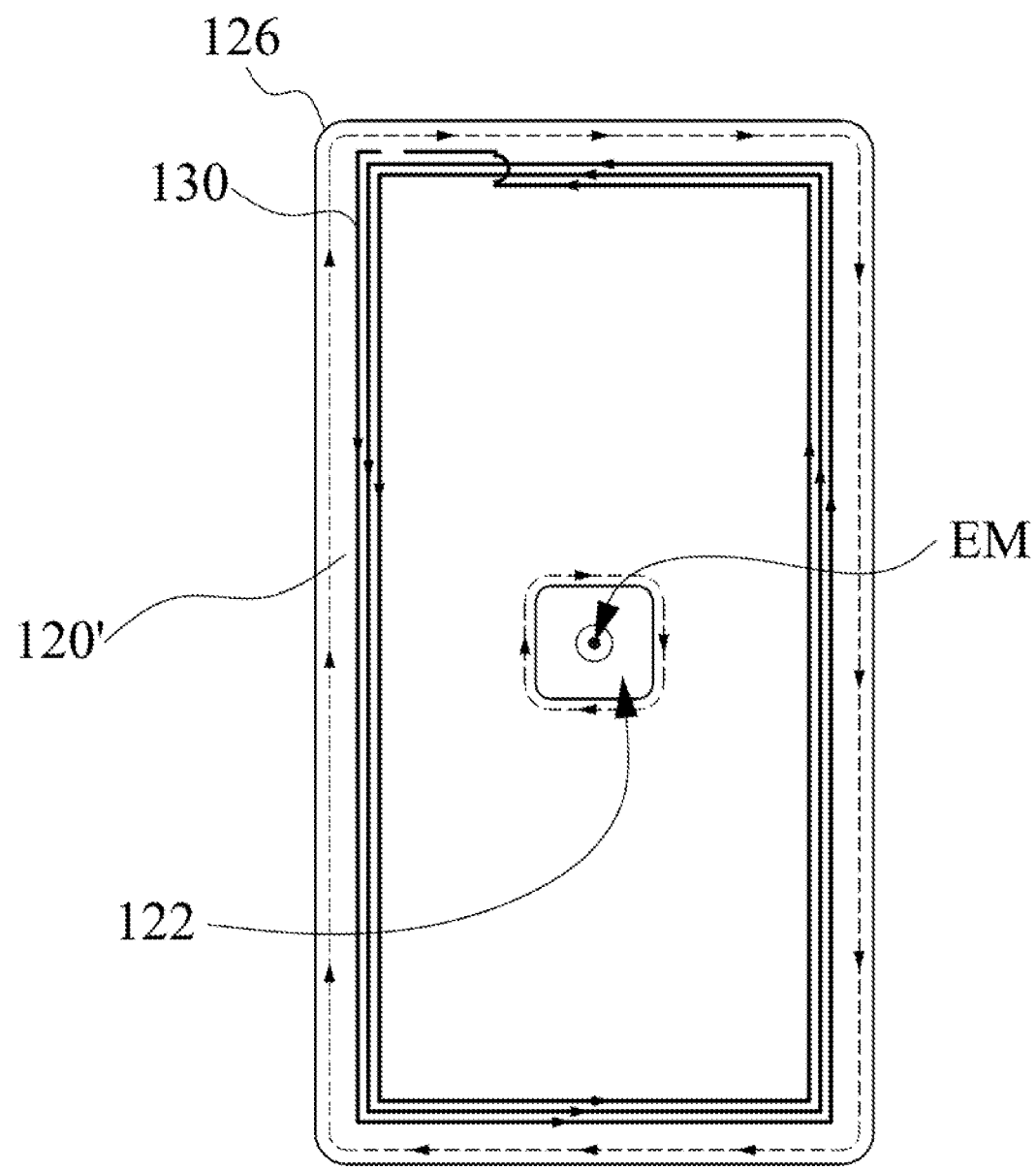
FIG. 2B is a current distribution diagram of the metal housing and the receiving coil during charging when the metal housing is not formed with a slit.

Reference is now made to FIG. 2B which provides a comparison with FIG. 2A, that is, FIG. 2B is a current distribution diagram of a metal housing 120' and the receiving coil 130 during charging when the metal housing 120' is not formed with the slit 124 (see FIGS. 1 and 2A). If the metal housing 120' is not formed with the slit 124, the inductive current direction around the aperture 122 and around the edge 126 of the metal housing 120 is opposite to the inductive current direction of the receiving coil 130. Therefore, the inductive magnetic fields induced by these two parts of the inductive currents may cancel one another. Accordingly, the energy received by the receiving coil 130 may be significantly reduced.

Reference is made again to FIG. 1 and FIG. 2A. In this embodiment, because the metal housing 120 has two slits 124, the inductive current around the aperture 122 may flow along the slits 124 and the edge 126 of the metal housing 120 so that the inductive currents of the metal housing 120 flowing on two sides of the slits 124 are induced to form two counterclockwise closed loops respectively. Accordingly, the two parts of the inductive currents form two inductive magnetic fields IM and the direction thereof is the same as that in the receiving coil 130 (i.e. vertically out of the drawing). Thus, the inductive magnetic fields IM contribute to increase the inductive current in the receiving coil 130 and the charging efficiency of the wireless charging receiving device 100 is therefore improved. It should be noted that the number of turns for the receiving coil 130 shown in FIG. 1 is merely an example and this invention is not limited in this regard. A person having ordinary skill in the art may design the receiving coil 130 having as many turns as required.

Reference is made to FIG. 1. It should be noted that although there are two slits 124 in this embodiment, this invention is not limited to such a configuration. In other embodiments, there may be only one slit 124, and the effect to change the direction of the inductive current would also be realized with such a configuration. In other embodiments, the number of the slits 124 may be even and the slits 124 are disposed symmetrically relative to the aperture 122. In other words, the metal housing 120 may be divided into plural metal pieces so that the directions of the inductive current in each of the metal pieces are substantially consistent, such that the object of changing the direction of the inductive current is fully realized.

In this embodiment, the wireless charging receiving device 100 may be, for example, a mobile phone and the metal housing 120 may be, for instance, the back cover of the mobile phone. In this case, the metal back cover not only enhances the aesthetics of the mobile phone, but also improves the charging efficiency of the wireless charging receiving device 100 by the design of the metal housing 120. Moreover, in FIG. 1, although the metal housing 120 is divided into two metal pieces by the aperture 122 and the slits 124, an insulating material may be filled in the slits 124 or a tape may be attached to the two metal pieces in order to join the two metal pieces.

In this embodiment, the wireless charging receiving device 100 further includes a capacitor 150 which is electrically coupled to the receiving coil 130. The capacitor 150 is utilized to adjust the resonant frequency of the receiving coil 130. In other words, the wireless charging receiving device 100 of this embodiment receives the energy of the electromagnetic waves by magnetic resonance (e.g., a resonant frequency of 6.78 MHz). The capacitance of the capacitor 150 is adjusted by a processor in order to select the resonant frequency of the receiving coil 130. When the electromagnetic waves of a transmitting source have a specific emitting frequency, the resonant frequency of the receiving coil 130 is adjusted synchronously to match the emitting frequency so that the receiving efficiency of the receiving coil 130 is improved.

Figure 3:
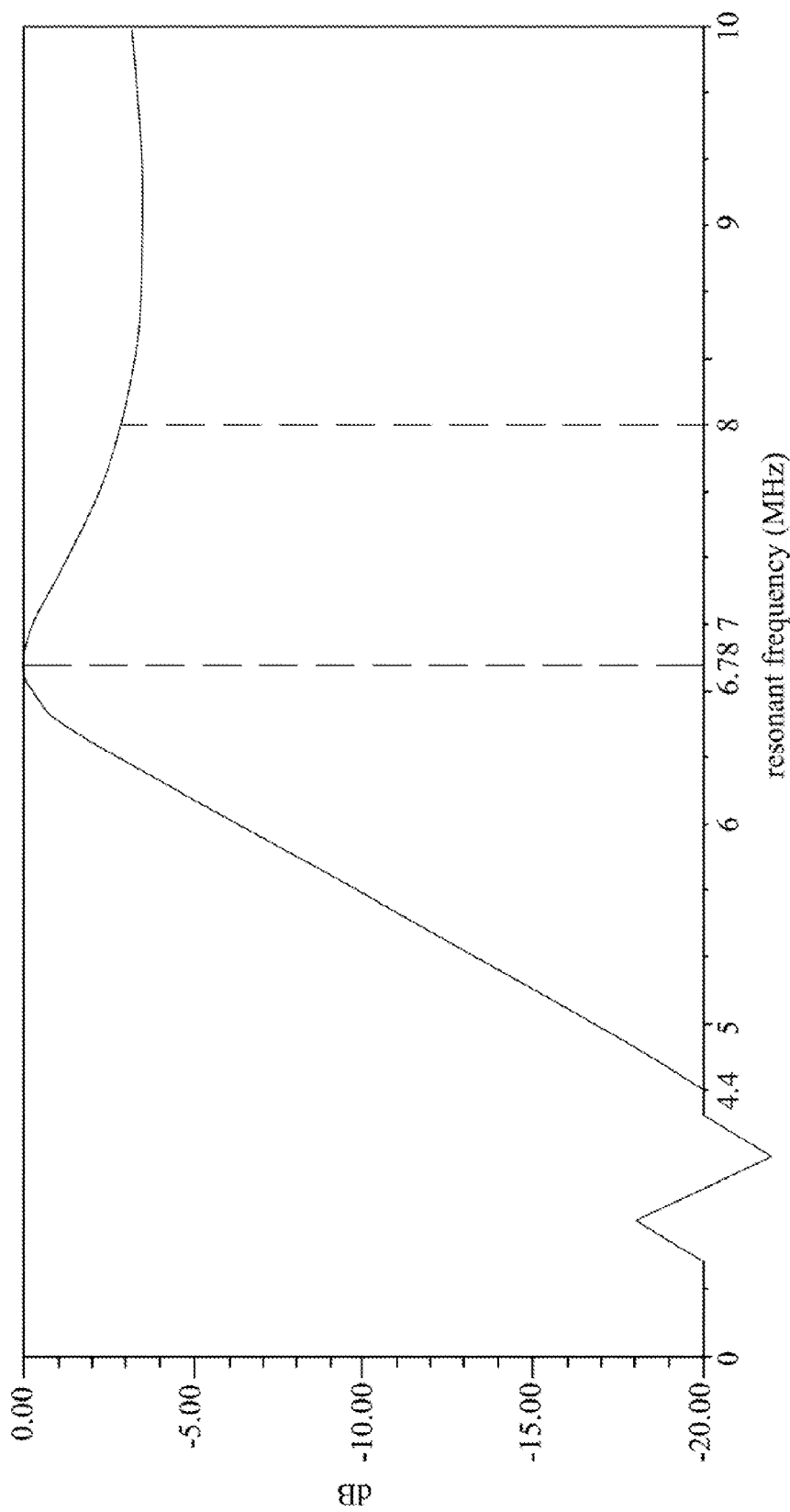
FIG. 3 is an energy loss diagram of the receiving coif according to one embodiment of this invention.

Reference is made to FIG. 3 which is an energy loss diagram of the receiving coil 130 according to one example of this invention. In this example, when the emitting frequency of the transmitting source is about 6.78 MHz and the resonant frequency of the receiving coil 130 (as shown in FIG. 1) is also about 6.78 MHz, under ideal circumstances, the energy loss is substantially equal to 0 dB. That is, almost no energy loss occurs. Thus, the efficiency of transmitting and receiving is at an optimal level. Therefore, it is confirmed that the receiving efficiency of the receiving coil 130 is enhanced by adjusting the resonant frequency of the receiving coil 130.

Reference is made back to FIG. 1. In this embodiment, the capacitor 150 is disposed at one end 134 of the receiving coil 130. In greater detail, the capacitor 150 and the receiving coil 130 may be both fixed on the metal housing 120. The end 134 of the receiving coil 130 may be connected to one end of the capacitor 150 in series, and the other end of the capacitor 150 is electrically coupled to the power storage device 140. For example, the other end of the capacitor 150 may be connected to a spring strip 162, and the spring strip 162 is electrically coupled to the power storage device 140. Moreover, the other end 136 of the receiving coil 130 may be directly connected to a spring strip 164, and not pass through the capacitor 150. The spring strip 164 is electrically coupled to the power storage device 140. It should be noted that the spring strips 162, 164 are provided by way of example and do not limit this invention. A person of ordinary skill in the art may select a suitable way to electrically couple the receiving coil 130 and the capacitor 150 to the power storage device 140, depending on actual requirements.

Figure 4:
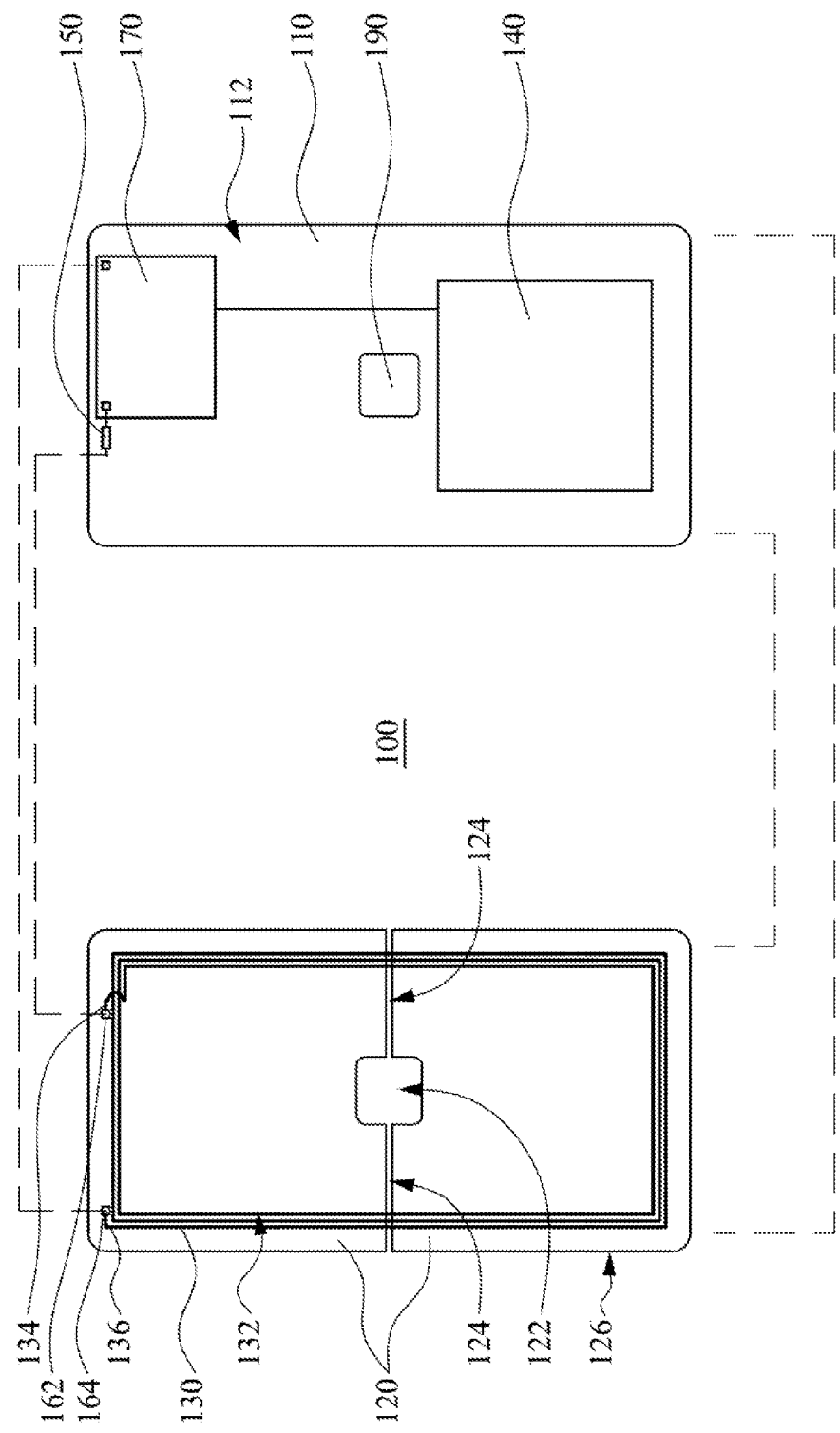
FIG. 4 is a schematic exploded view of a wireless charging receiving device according to another embodiment of this invention.

The manner in which the capacitor 150 is connected is not limited to the structure described above. Reference is made to FIG. 4 which is a schematic exploded view of a wireless charging receiving device 100 according to another embodiment of this invention. The difference between this embodiment and the embodiment of FIG. 1 relates to the position of the capacitor 150. In this embodiment, the capacitor 150 is disposed on the body 110. Accordingly, the spring strip 162 may be connected to one end 134 of the receiving coil 130, and the capacitor 150 may be electrically coupled to the receiving coil 130 by the spring strip 162. Moreover, the other end 136 of the receiving coil 130 does not pass through the capacitor 150 and is directly connected to the spring strip 164. The spring strip 164 is electrically coupled to the power storage device 140.

Reference is made again to FIG. 1. In this embodiment, the wireless charging receiving device 100 further includes a receiving module 170 which is electrically coupled to the receiving coil 130 and the power storage device 140. For example, in FIG. 1, the receiving coil 130 may be electrically connected to the receiving module 170 by the spring strips 162, and 164. The receiving module 170 may be utilized to match the electrical property of the energy generated by the receiving coil 170 with the electrical property which may be received by the power storage device 140. Accordingly, the inductive current of the receiving coil 130 may first be transferred to the receiving module 170. After electrically matching by the receiving module 170, the inductive current is then transferred to the power storage device 140.

Figure 5:
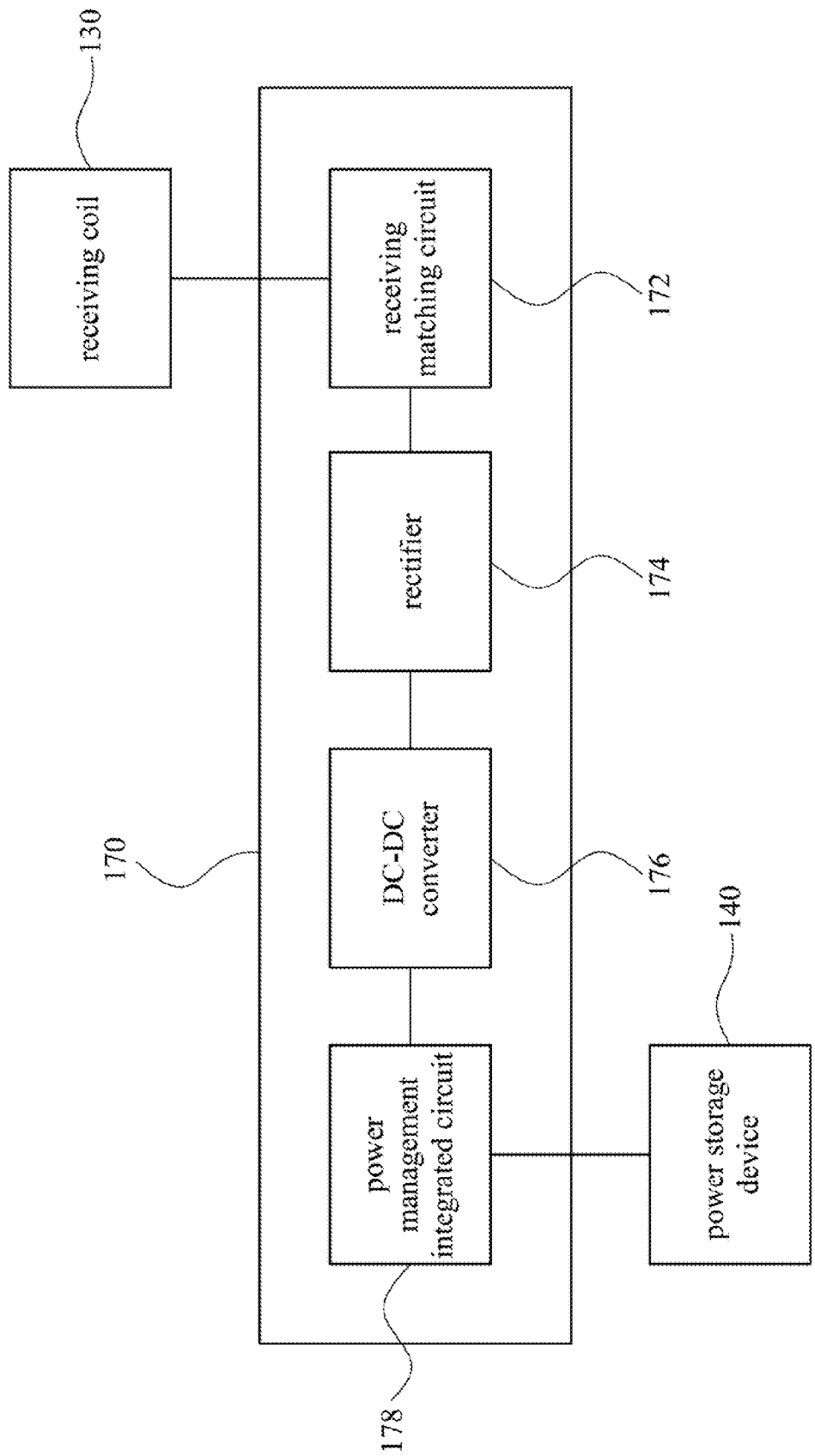
FIG. 5 is a function block diagram of the receiving coil, a power storage device, and a receiving module.

Reference is made to FIG. 5 which is a function block diagram of the receiving coil 130, the power storage device 140, and the receiving module 170 in FIG. 1. In this embodiment, the receiving module 170 includes a receiving matching circuit 172, a rectifier 174, a DC-DC converter 176 and a power management integrated circuit 178. The receiving matching circuit 172 is utilized to match an impedance between the transmitting source (not shown) and the receiving coil 130. The rectifier 174 is utilized to transform the inductive current of the receiving coil 130 into a direct current. The DC-DC converter 176 is utilized to adjust a voltage of the direct current. The power management integrated circuit 178 is connected to the power storage device 140 and is utilized to transmit the direct current to the power storage device 140 and manage the power transfer of the power storage device 140. The elements of the wireless charging receiving device 100 shown in FIG. 1, FIG. 4, and FIG. 5 may be disposed in the accommodating space.

In greater detail, when the transmitting source transfers the electromagnetic waves to the receiving coil 130, the receiving matching circuit 172 may match the impedance between the transmitting source and the receiving coil 130 so that the magnetic coupling between the electromagnetic waves and the receiving coil 130 may be improved. The inductive current generated by the receiving coil 130 is subsequently transferred to the rectifier 174, and the rectifier 174 rectifies the inductive current into a direct current. The DC-DC converter 176 adjusts the voltage of the direct current as required by the power storage device 140 and transfers the current to the power management integrated circuit 178. The power management integrated circuit 178 transfers the DC power to the power storage device 140. The charging of the wireless charging receiving device 100 is completed through such a process. It should be noted that when the wireless charging receiving device 100 needs to use the power, the power management integrated circuit 178 may transfer the power from the power storage device 140 to other elements. The power management integrated circuit 178 functions to manage the power transfer of the power storage device 140 and prevent overcharging. However, in other embodiments, before the DC current is transferred to the power storage device 140 by the power management integrated circuit 178, the DC current may be first stored in a temporary power storage device (not shown). The power in the temporary power storage device may then be transferred to the power storage device 140 in response to receiving instructions from the power management integrated circuit 178 to thereby complete the charging process. The temporary power storage device may be disposed in the receiving module 170 or may be independent from the receiving module 170. The temporary power storage device is electrically coupled between the power management integrated circuit 178 and the power storage device 140.

Reference is made again to FIG. 1. The wireless charging receiving device 100 further includes a camera module 190 which is disposed on the body 110 and corresponds in position to the aperture 122 of the metal housing 120. In other words, the lens of the camera module 190 may be exposed by the aperture 122. Accordingly, it is not necessary for the metal housing 120 to be designed with an extra aperture. However, the camera module 190 is merely example, and in other embodiments, the aperture 122 may be disposed to expose any element, and this invention is not limited to such a structure.

Figure 6:
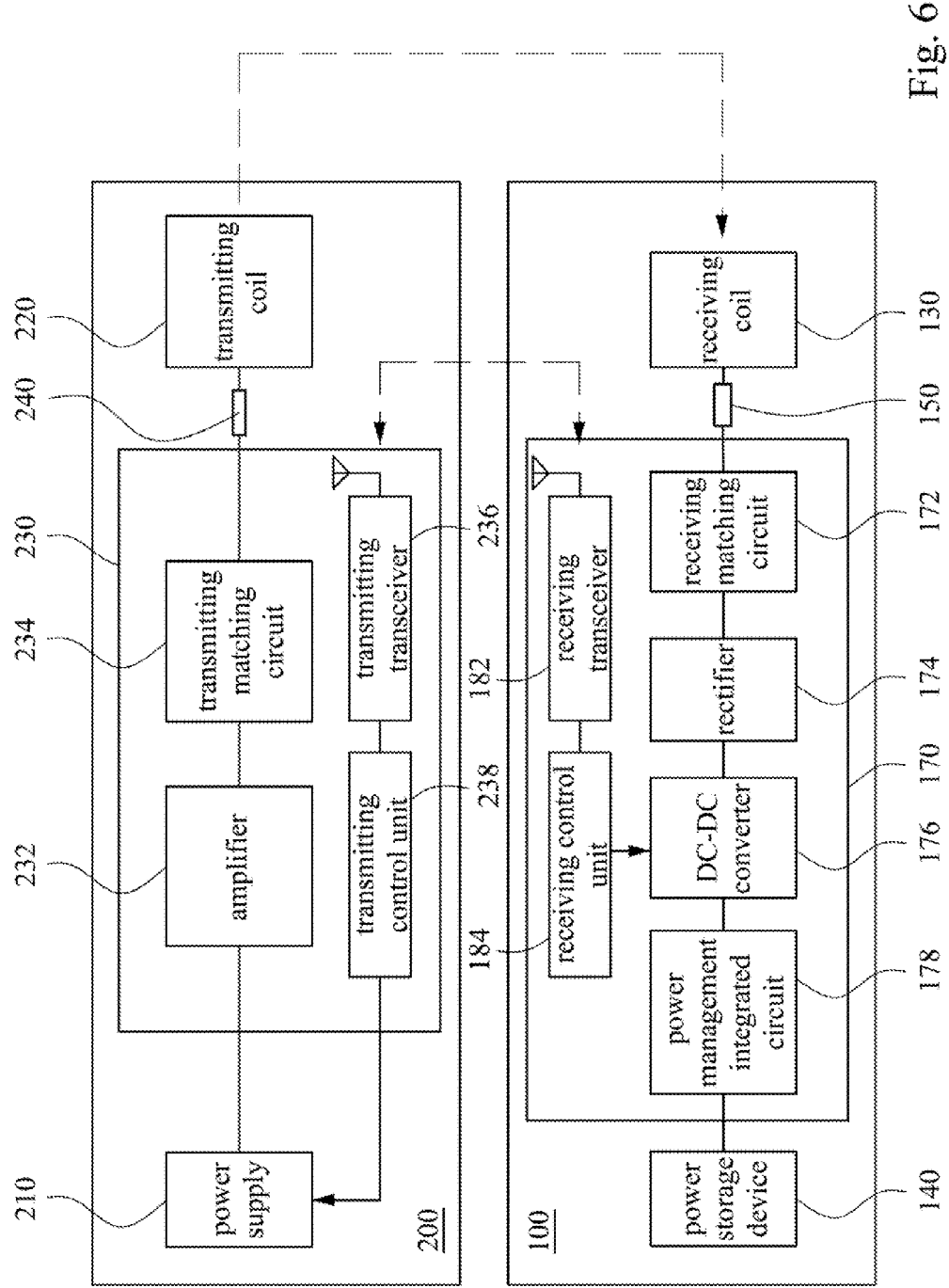
FIG. 6 is a function block diagram of a wireless charging system according to one embodiment of this invention.

Another aspect of this invention is to provide a wireless charging system using the wireless charging receiving device 100 above. Reference is made to FIG. 6 which is a function block diagram of a wireless charging system according to one embodiment of this invention. The wireless charging system includes a wireless charging transmitting device 200 and the wireless charging receiving device 100. The wireless charging transmitting device 200 is utilized to provide the electromagnetic waves. In other words, the wireless charging transmitting device 200 is capable of transforming power into electromagnetic waves, after which the wireless charging transmitting device transfer the electromagnetic waves to the wireless charging receiving device 100 to charge the wireless charging receiving device 100.

In this embodiment, the wireless charging transmitting device 200 includes a power supply 210 and a transmitting coil 220. The power supply 210 is utilized to provide an electrical energy. The transmitting coil 220 is utilized to transform the electrical energy into the electromagnetic waves. In greater detail, the electrical energy provided by the power supply 210 is transferred to the transmitting coil 220 in current form. The current in the transmitting coil 220 may induce an inductive magnetic field. The inductive magnetic field is transmitted in electromagnetic wave form. The receiving coil 130 of the wireless charging receiving device 100 is magnetically coupled to the electromagnetic waves to charge the wireless charging receiving device 100.

In order to transform the electrical power provided by the power supply 210 into electromagnetic waves in a specific format so that the electromagnetic waves are easily magnetically coupled to the receiving coil 130, the wireless charging transmitting device 200 may further include a transmitting module 230 which is electrically coupled to the power supply 210 and the transmitting coil 220. The transmitting module 230 includes an amplifier 232 and a transmitting matching circuit 234. The amplifier 232 is utilized to amplify the power provided by the power supply 210. The transmitting matching circuit 234 is utilized to match an impedance between the transmitting coil 220 and the receiving coil 130.

In greater detail, the electrical energy provided by the power supply 210 may be, for example, transferred to the amplifier 232 in current form. Thus, the amplifier 232 may amplify the current to increase the power so that the wireless charging transmitting device 200 easily performs far distance transmission. The current is then transferred to the transmitting matching circuit 234, and the transmitting matching circuit 234 may match the impedance between the transmitting coil 220 and the receiving coil 130. Accordingly, the magnetic coupling between the electromagnetic waves generated by the transmitting coil 220 and the receiving coil 130 is enhanced. The current is transferred to the transmitting coil 220 and the electromagnetic waves are induced.

In one or more embodiments, signal communication may be performed between the wireless charging transmitting device 200 and the wireless charging receiving device 100 to determine whether the wireless charging transmitting device 200 charges the wireless charging receiving device 100. In greater detail, the transmitting module 230 of the wireless charging transmitting device 200 further includes a transmitting transceiver 236 and a transmitting control unit 238. The transmitting transceiver 236 is utilized to communicate with the wireless charging receiving device 100. The transmitting control unit 238 is electrically coupled to the transmitting transceiver 236. The transmitting control unit 238 controls the on/off state of the power supply 210 according to the charging status of the wireless charging receiving device 100. Moreover, the receiving module 170 of the wireless charging receiving device 100 may further include a receiving transceiver 182 and a receiving control unit 184. The receiving transceiver 182 is utilized to communicate with the transmitting transceiver 236 of the wireless charging transmitting device 200. The receiving control unit 184 is electrically coupled to the receiving transceiver 182 and the DC-DC converter 176. The receiving control unit 184 obtains the charging status of the power storage device 140 from the DC-DC converter 176 and transmits a signal of the charging status to the transmitting transceiver 236. However, in other embodiments, the receiving control unit 184 may obtain the charging status of the power storage device 140 from the power management integrated circuit 178, and this invention is not limited in this regard.

For example, when the wireless charging receiving device 100 needs to be charged, the power management integrated circuit 178 may transmit the charging requirement to the receiving control unit 184 through the DC-DC converter 176. The charging requirement may be transmitted to receiving transceiver 182, the transmitting transceiver 236, and the transmitting control unit 238 in sequence. Accordingly, the transmitting control unit 238 outputs a command to turn on the power supply 210 so that the wireless charging transmitting device 200 generates the electromagnetic waves to charge the wireless charging receiving device 100.

When the power storage device 140 of the wireless charging receiving device 100 is fully charged, the power management integrated circuit 178 may transmit a shutdown requirement to the receiving control unit 184 through the DC-DC converter 176. The shutdown requirement may be transmitted to the transmitting control unit 238 through the path mentioned above. Accordingly, the transmitting control unit 238 outputs a command to turn off the power supply 210 so that the wireless charging transmitting device 200 stops generating the electromagnetic waves. Charging of the wireless charging receiving device 100 is completed through such a process. Moreover, when the wireless charging receiving device 100 is placed close to the wireless charging transmitting device 200 in a state where the wireless charging receiving device 100 does not have a charging requirement, the wireless charging receiving device 100 may transmit a shutdown requirement to the wireless charging transmitting device 200 so that the wireless charging transmitting device 200 does not generate electromagnetic waves.

In this embodiment, the wireless charging transmitting device 200 may further include a capacitor 240 which is electrically coupled to the transmitting coil 220 to adjust an emitting frequency of the transmitting coil 220. In other words, in this embodiment, the wireless charging transmitting device 200 may generate electromagnetic waves with a specific emitting frequency. The emitting frequency of the transmitting coil 220 may be selected by changing the capacitance of the capacitor 240. Furthermore, the wireless charging receiving device 100 may include the capacitor 150 to adjust the resonant frequency of the receiving coil 130. When the resonant frequency of the receiving coil 130 is the same as the emitting frequency of the electromagnetic waves generated by the wireless charging transmitting device 200, the resonant effect occurs so that the energy coupling therebetween is increased. In this embodiment, the resonant frequency can be configured at 6.78 MHz which is the magnetic resonant frequency established by Alliance for Wireless Power (A4WP). Reference is made to FIG. 3 again. The emitting frequency generated by the wireless charging transmitting device 200 is between 0 and 10 MHz. In other words, energy transfer and reception between the wireless charging transmitting device 200 and the wireless charging receiving device 100 may be operated within such a frequency range. However, the efficiency may depend on the operation frequency.

Reference is made to FIG. 6. In another embodiment, the wireless charging receiving device 100 may omit the capacitor 150 from the configuration thereof, and thus the operation frequency of the receiving coil 130 is not adjusted synchronously according to the resonant frequency of the wireless charging transmitting device 200. The energy is still transferred and received between the wireless charging transmitting device 200 and the wireless charging receiving device 100, and the receiving coil 130 of the wireless charging receiving device 100 is magnetically coupled to the electromagnetic waves by the magnetic induction. Because of the capacitor 240, the operation frequency of the wireless charging transmitting device 200 can be set as 6.78 MHz to improve the charging efficiency. In yet another embodiment, the capacitor 240 may be omitted from the configuration of the wireless charging transmitting device 200 and the emitting frequency of the transmitting coil 220 is between 0 and 10 MHz. The wireless charging receiving device 100 may include the capacitor 150 in such an embodiment, and the resonant frequency of the receiving coil 130 may be adjusted to be the same as the emitting frequency of the transmitting coil 220. The receiving coil 130 may be magnetically coupled to the electromagnetic waves in a magnetically resonant manner. For example, if the emitting frequency of the transmitting coil 220 is 8 MHz, the resonant frequency of the receiving coil 130 may be adjusted to 8 MHz. If the emitting frequency of the transmitting coil 220 approaches 6.78 MHz, the resonant frequency of the receiving coil 130 may also be adjusted to 6.78 Mhz so that the best charging efficiency may be accomplished. That is, when one of the wireless charging receiving device 100 and the wireless charging transmitting device 200 includes the capacitor 150 and/or the capacitor 240, the magnetic coupling between the wireless charging receiving device 100 and the wireless charging transmitting device 200 may be improved.

Although the present invention has been described in considerable detail with reference to certain embodiments thereof, other embodiments are possible. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wireless charging receiving device, comprising:
   a body;
   a metal housing coupled to the body to form an accommodating space, wherein the metal housing comprises an aperture and at least one slit, and the slit interconnects the aperture and an edge of the metal housing;
   a receiving coil disposed between the metal housing and the body, wherein the receiving coil defines a through hole by a looped configuration, wherein the through hole overlaps at least part of the aperture of the metal housing;
   a power storage device disposed within the accommodating space and electrically connected to the receiving coil, wherein electromagnetic waves are capable of passing through the aperture of the metal housing and magnetically coupling to the receiving coil, such that the receiving coil transfers an energy of the electromagnetic waves to the power storage device; and
   a tunable capacitor electrically coupled to the receiving coil to synchronously adjust a resonant frequency of the receiving coil to match an emitting frequency of a wireless charging transmitting device.

2. The wireless charging receiving device of claim 1, wherein the tunable capacitor is disposed at one end of the receiving coil.

3. The wireless charging receiving device of claim 1, further comprising:
   a spring strip connected to one end of the receiving coil, wherein the tunable capacitor is electrically coupled to the receiving coil by the spring strip.

4. The wireless charging receiving device of claim 1, wherein the number of the slits is even and the slits are symmetrically disposed relative to the aperture.

5. The wireless charging receiving device of claim 1, further comprising:
   a receiving module electrically coupled to the receiving coil and the power storage device.

6. The wireless charging receiving device of claim 5, wherein the receiving module comprises:
   a receiving matching circuit utilized to match an impedance between a transmitting source and the receiving coil;
   a rectifier utilized to transform an inductive current of the receiving coil to a direct current;
   a DC-DC converter utilized to adjust a voltage of the direct current; and
   a power management integrated circuit connected to the power storage device and utilized to transmit the direct current to the power storage device and manage power transfer of the power storage device.

* * * * *